United States Patent [19]

Hishida

[11] Patent Number: 4,743,060

[45] Date of Patent: May 10, 1988

[54] EMERGENCY LOCKING APPARATUS FOR GLOVE BOX LID

[75] Inventor: Osamu Hishida, Fuchu, Japan

[73] Assignee: Nissan Motor Co., Ltd., Yokohama, Japan

[21] Appl. No.: 917,486

[22] Filed: Oct. 10, 1986

[30] Foreign Application Priority Data

Oct. 15, 1985 [JP] Japan .............................. 60-156454[U]

[51] Int. Cl.$^4$ .......................... B62D 25/12; B60R 7/06
[52] U.S. Cl. .................................... 296/37.12; 296/70;
296/189; 403/2; 403/11; 224/282; 16/257
[58] Field of Search .................... 296/37.8, 37.12, 189,
296/70, 37.8, 37.12; 403/2, 11; 224/282;
220/335; 217/60 B; 16/222, 223, 227, 231, 257,
267, 346, 347, DIG. 13

[56] References Cited

U.S. PATENT DOCUMENTS

| | | | |
|---|---|---|---|
| 2,677,479 | 5/1954 | Kiba | 16/257 X |
| 2,960,254 | 11/1960 | Kiba | 16/DIG. 13 X |
| 3,087,192 | 4/1963 | Hertzke | 16/257 |
| 4,007,564 | 2/1977 | Chisholm | 403/2 X |
| 4,086,686 | 5/1978 | Takabayashi | 16/DIG. 13 X |
| 4,239,277 | 12/1980 | Oda | 296/37.12 |
| 4,436,273 | 3/1984 | Yuda et al. | 403/2 X |

FOREIGN PATENT DOCUMENTS

| | | | |
|---|---|---|---|
| 8975 | 1/1980 | Japan | 296/37.12 |
| 59036 | 5/1980 | Japan | 224/282 |
| 140280 | 8/1982 | Japan | 296/37.12 |
| 59-26050 | 2/1984 | Japan | |

*Primary Examiner*—Dennis H. Pedder
*Attorney, Agent, or Firm*—Foley & Lardner, Schwartz, Jeffery, Schwaab, Mack, Blumenthal & Evans

[57] ABSTRACT

An apparatus for emergency locking of a lid for a glove compartment where the lid is pivotally attached to the opening portion of the glove compartment at the lower end thereof comprises an arm connected to the lid at one end thereof and inserted into an arm receiving hole formed in at least one side wall of the glove compartment. The arm has a first engaging portion disposed at the other free end thereof and engaged with the side wall when the lid is opened. The arm further has a second engaging portion disposed between both ends of the arm. A claw hook is disposed in the vicinity of the lower wall portion of the arm receiving hole and is capable of engaging with the second engaging portion of the arm to prevent the lid from being displaced in the opening direction thereof when the lid is pressed slantingly downwards.

7 Claims, 5 Drawing Sheets

EMERGENCY LOCKING APPARATUS FOR GLOVE BOX LID

BACKGROUND OF THE INVENTION

The present invention relates to an emergency locking apparatus for a glove box lid which prevents opening of the lid when an impulsive deforming force in the oblique lower front direction is applied to the upper part of the instrument panel or the lid for the glove box.

There are some known emergency lid locking devices which are designed to prevent the opening of the lid for the glove box, even when a passenger's head hits the instrument panel or the lid for the glove box in a collision of a motor vehicle.

As a glove box equipped with such an emergency locking apparatus one may mention, for instance, the apparatus which is disclosed in Japanese Laid-Open Utility Model No. 59-26050. In this Model, there is disclosed a glove box as shown in FIGS. 1 to FIG. 3.

In FIG. 1 and FIG. 2, in the front 1a of the instrument panel 1, there is opened a glove box 2. The aperture 2a of the glove box 2 can be closed and opened with a lid 3 that can be turned upward and downward with the lower edge of the lid as the center axis. In addition, on the sides of the aperture 2a, there are provided end walls 4 that are indented one step into the interior of the box. On the end walls 4, there are drilled arm insertion openings 5 through which are inserted arc-shaped stopper arms 6. The outer ends of the stopper arms 6 are fixed to both side sections of the inner surface of the lid 3. Moreover, on the inner ends of the stopper arms 6 there are provided first engaging pawls 7, and in the neighborhood of the outer ends of the stopper arms 6 there are provided second engaging pawls 8 as the arm engaging units.

Further, in FIG. 3 is shown the case in which engaging notches 9 are provided in place of the engaging pawls 8 as the arm engaging units on the stopper arms 6.

With such a configuration, there sometimes occurs a situation in a collision of a motor vehicle in which the lid 3 is displaced obliquely toward the lower front due to a passenger's head hitting in the direction of the arrow 10, against the upper part of the instrument panel 1 or of the lid 3. In such a case, the engaging pawls 8 or the engaging notches 9 are caught by the lower edge sections 4a of the arm insertion openings 5 on the side walls 4, as indicated by the doubly dotted chain lines in the figures, to deter the opening of the lid 3.

However, even in this condition, engaging pawls 8 or the engaging notches 9 are not necessarily engaged with the lid 3 securely enough in the vertical direction, so that if there is a reaction or there are applied vibrations in the vertical direction on the vehicle body, it is possible that the engaging pawls 8 or the engaging notches 9 get out of place from the lower edge sections 4a of the arm insertion openings 5 on the side walls 4. This aspect has been regarded to require some kind of improvement.

SUMMARY OF THE INVENTION

An object of the present invention is to provide an emergency locking apparatus for the lid of a glove box which can reliably prevent the opening of the lid.

With the above object in view, the present invention resides in an apparatus for emergency locking of a lid for a glove compartment where the lid is pivotally attached to the opening portion of the glove compartment at the lower end thereof, said apparatus comprising arm means connected to the lid at one end thereof and inserted into arm receiving hole means formed in at least one side wall of the glove compartment, said arm means having a first engaging portion disposed at the other free end thereof and engaged with said side wall when the lid is opened, said arm means further having a second engaging portion disposed between said both ends of the arm means, and claw hook means disposed in the vicinity of the lower wall portion of the arm receiving hole means and capable of engaging with the second engaging portion of the arm means to prevent the lid from being displaced in the opening direction thereof when the lid is pressed slantingly downwards.

DETAILED DESCRIPTION OF THE PREFERRED EMBODIMENTS

Figure 1:
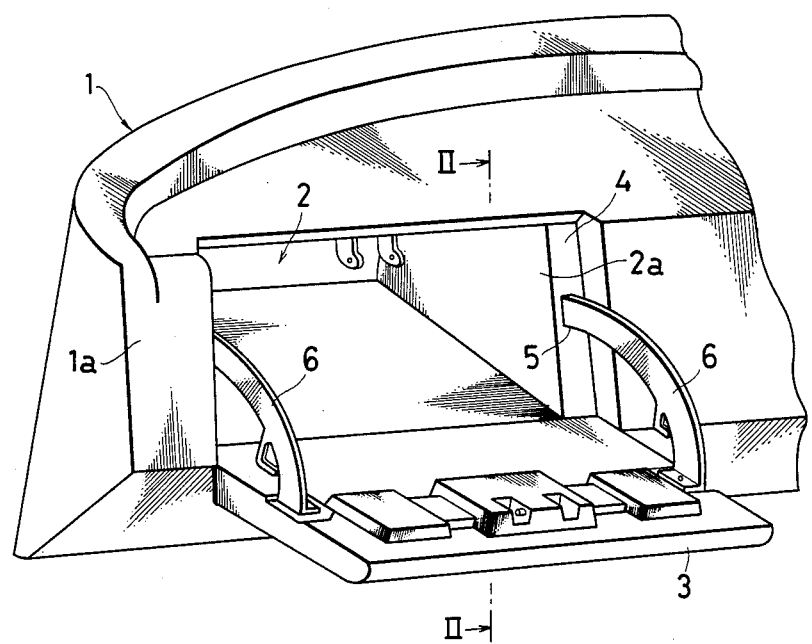
FIG. 1 is a perspective view for illustrating the relationship between the instrument panel and the glove box that is equipped with a prior-art emergency locking apparatus.
Figure 2:
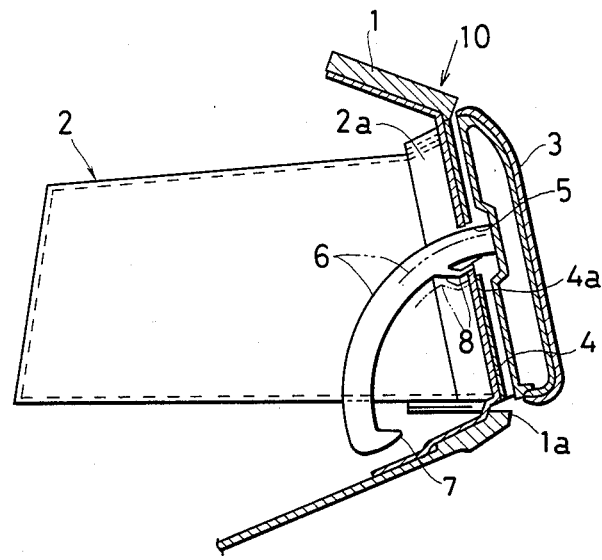
FIG. 2 is a sectional view along the line II—II of the lid shown in FIG. 1 in its closed condition.
Figure 3:
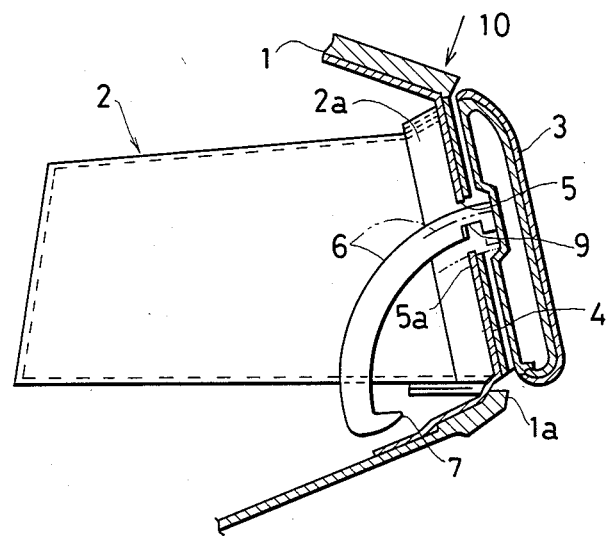
FIG. 3 is a sectional view similar to FIG. 2 which shows another example of the prior-art emergency locking apparatus.
Figure 4:
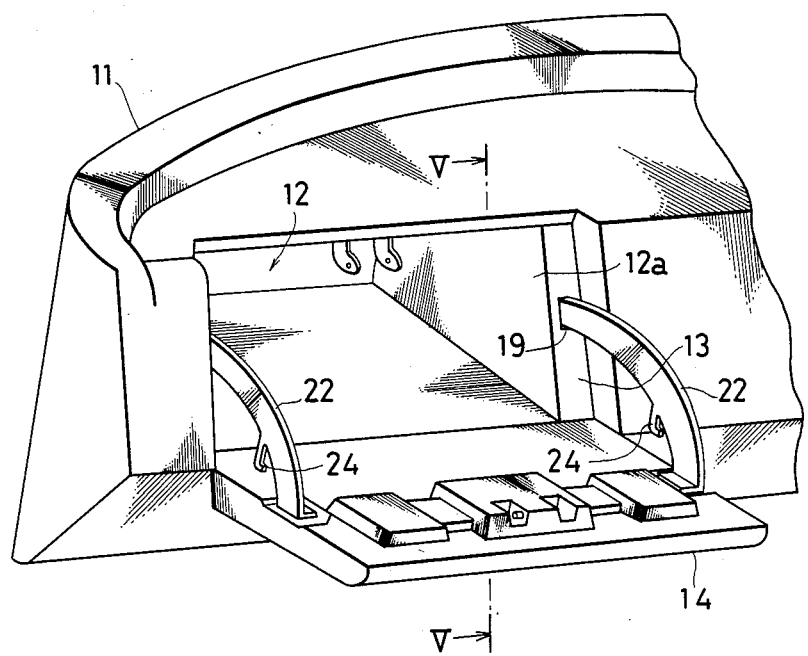
FIG. 4 is a perspective view for illustrating the relationship between the instrument panel and the glove box that is equipped with an embodiment of the present invention.
Figure 5:
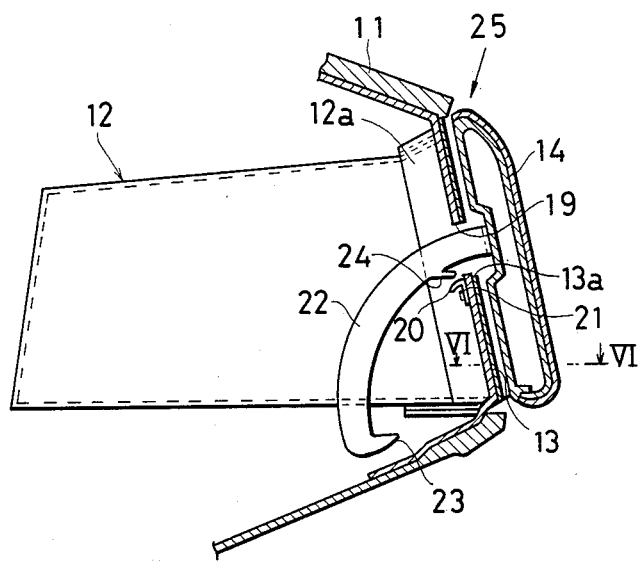
FIG. 5 is a sectional view along the line V—V in the condition when the lid of FIG. 4 is closed.

In FIG. 4 and FIG. 5, 11 is the instrument panel of the motor vehicle, 12 is a glove box or a glove compartment which is provided in the instrument panel on the opposite side to the driver's seat, 12a is the aperture of the glove box 12, 13 are end walls that are formed one step toward the interior on the sides of the aperture 12a, and 14 is a lid for closing and opening the aperture 12a.

Figure 6:
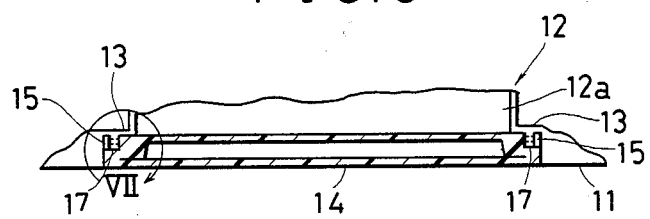
FIG. 6 is a sectional view along the line VI—VI of FIG. 5.
Figure 7:
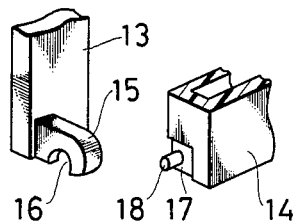
FIG. 7 is a detailed disassembled view of the part encircled by the arrow VII in FIG. 6.

The end or side walls 13 are provided on both sides of the aperture 12a, as shown in FIG. 6, and the end walls 13 and 13 have lid supporting projections 15 and 15 in their respective lower parts. On each of the lid supporting projections 15 there is formed a shaft holding notch 16 as shown in FIG. 7. Further, on both sides of the inner surface of the lower end of the lid 14, there are provided stepped parts 17, with supporting shafts 18 projecting from each of the stepped parts 17. By the insertion of the supporting shafts 18 in to the shaft holding notches 16, the lid 14 is arranged to be turnable upward and downward with its lower edge as the center.

In the central parts along the longitudinal direction of the end walls 13, there are formed arm insertion openings 19 that are opened on the sides of the glove box 12, as shown in FIG. 4 and FIG. 5. Moreover, in the lower edges 13a on the inner surface of the end walls 13 of the arm insertion openings 19, pawl engaging pieces 20 of approximately L shape made of steel plate are fixed with bolts 21 to serve as pawl engaging units.

In addition, arc-shaped stopper arms 22 are inserted through the arm insertion openings 19. The outer ends of the stopper arms 22 are fixed to the inner surface on both sides of the lid 14. In the inner end sections of the stopper arms 22 there are formed, in the unified body, first engaging pawls 23 which serve as first engaging units, and in the neighborhood of the outer end sections of the stopper arms 22 there are formed, in unified body, second engaging pawls 24 which are second engaging units that serve as pawl engaging units.

Next, the operation of the emergency locking apparatus for the lid of glove box with such a configuration will be described.

Figure 8:
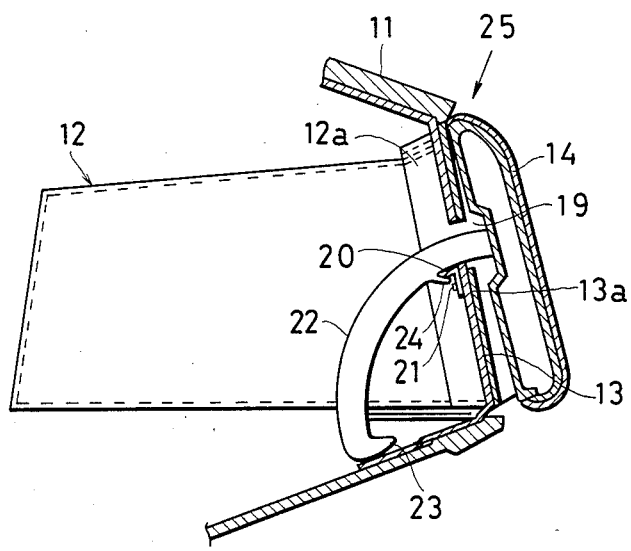
FIG. 8 is a sectional view similar to FIG. 5 in the condition when the emergency locking apparatus is in operation.

With such a configuration, if an impulsive deforming force is applied to the upper part of the instrument panel or the lid 14 of the glove box 12 in the direction of the arrow 25, the supporting shaft 18 of the lid 14 comes off the shaft supporting notches 16, displacing the lid 14 in the oblique lower front direction. with this motion, the stopper arms 22 are displaced in the oblique lower front direction, and the engaging pawls 24 on the stopper arms 22 are engaged with the bottom of the pawl engaging pieces 20 that are provided on the end walls, as shown in FIG. 8. As a result, the front-rear and the up-down displacements of the lid 14 can be obstructed.

Figure 9:
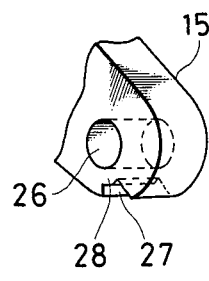
FIG. 9 and FIG. 10 are partial perspective views for illustrating other examples of the lid supporting projection shown in FIG. 4.
Figure 10:
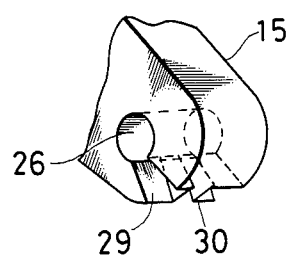

In conjunction with the above embodiment, description has been given in such a way that when a large downward deforming force is applied to the lid 14, the lid 14 is arranged to be displaced downward, by the provision of the shaft holding notches 16 in the lid supporting projection 15. However, the present invention is not necessarily limited to such an arrangement. Thus, for instance, as shown in FIG. 9, arrangement may be made to provide shaft supporting holes 26 in the lid supporting projections 15, and to form thin sections 28 by providing notches 27 close to the shaft supporting holes 26 to permit the thin sections 28 to be ruptured. Further, as shown in FIG. 10, a configuration may be chosen so as to provide thin and narrow linking sections 30 at the axially central sections of the notches which extend to the shaft supporting holes 26.

As described in the foregoing, according to the configuration of the present invention, opening of the lid can be prevented reliably even when the instrument panel or the glove box is hit by an inpulsive deforming force.

What is claimed is:

1. An apparatus for emergency locking of a lid for a glove compartment defined by a pair of side walls, a bottom wall, said walls defining an opening at the front of the glove compartment with a generally vertical orientation, wherein said lid is pivotally attached adjacent a lower portion of said opening in order to cover the opening of the glove compartment, said lid having a generally vertical orientation when said glove compartment is closed, said apparatus comprising:
   each of said side walls having an arm receiving hole formed therein;
   arm means having a first end thereof connected to the lid and inserted into said arm receiving hole, said arm means having a first engaging portion disposed at a second, free end thereof and engaged with said side wall when the lid is opened, said arm means further having a second engaging portion disposed between said first and second ends of the arm means; and
   pawl hook means disposed underneath and adjacent to each arm receiving hole and capable of selectively engaging said second engaging portion of the arm means to prevent the lid from being opened when the lid is pressed by a generally downwardly directed external force of at least a predetermined magnitude,
   said lid including a support shaft disposed on each of opposite sides thereof, each side wall of the compartment having a support means which defines a hole for receiving and vertically supporting each support shaft of said lid, and means, including a notch located adjacent to said support shaft receiving hole, for releasing said support shaft from said hole when said external force is applied to the lid and for permitting the second engaging portion to engage with the pawl hook means in response to said releasing.

2. An apparatus as claimed in claim 1, wherein said support means further comprises a thin wall section disposed between said hole and said notch, said thin wall section being capable of fracturing to thereby allow said support shaft to pass through said notch from said hole when external force is applied to said lid so that said second engaging portion is engaged with said pawl hook means.

3. An apparatus as claimed in claim 2, wherein said notch is completely separated from said hole by said thin wall section.

4. An apparatus as claimed in claim 2, wherein said thin wall section partially blocks said notch along a portion of the axial length of said hole.

5. An apparatus as claimed in claim 2, wherein said thin wall section is provided at a center edge section of said notch.

6. An apparatus as claimed in claim 1, wherein said notch has an opening width adjacent said hole smaller than the diameter of said hole.

7. An apparatus for the emergency locking of a lid for a glove compartment defined by a pair of side walls and a bottom wall, said walls defining a front opening of the glove compartment having a generally vertical orientation;
   a means for covering said opening including said lid, said lid being pivotally attached adjacent said bottom wall;
   each of said side walls including an arm receiving portion defining an arm receiving hole;
   pawl hooks disposed on each of said side walls;
   means for controlling the movement of said lid comprising: arm means having a pair of ends, one of said ends being inserted through said arm receiving hole into said arm receiving portion, said arm means including: first engaging means disposed at the other of said ends, said first engaging means engaging said side walls when said lid is in an open position; and second engaging means, disposed between said ends of said arm, said second engaging means preventing the opening of said lid in response to the application of a generally downwardly directed external force of at least a predetermined magnitude to said lid, by engaging with said pawl hooks; and
   means for selectively permitting said second engaging means to engage with said pawl hooks in response to said external force, said selective means including a means for pivotally supporting said lid and for selectively releasing said support upon the application of said external force.

* * * * *